Nov. 4, 1941. R. PEALE ET AL 2,261,277
PROCESS AND MECHANISM FOR SEPARATING INTERMIXED DIVIDED MATERIALS
Filed Oct. 1, 1938 2 Sheets-Sheet 1

INVENTORS
Richard Peale
Rembrandt Peale, Jr.
BY Morgan, Finnegan & Durham
ATTORNEYS

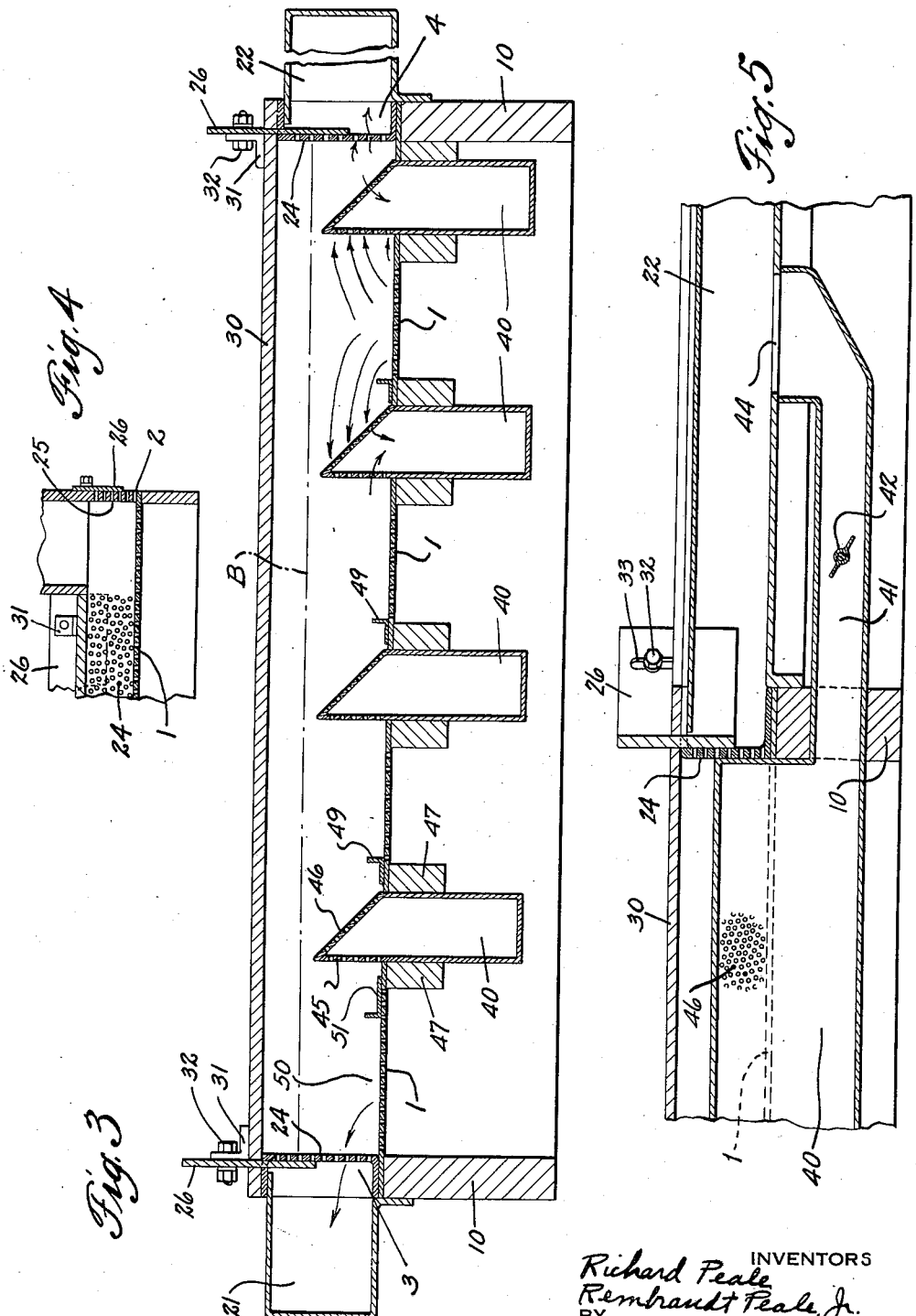

Patented Nov. 4, 1941

2,261,277

UNITED STATES PATENT OFFICE 2,261,277

PROCESS AND MECHANISM FOR SEPARATING INTERMIXED DIVIDED MATERIALS

Richard Peale and Rembrandt Peale, Jr., Clearfield, Pa.

Application October 1, 1938, Serial No. 232,808

10 Claims. (Cl. 209—467)

The invention relates to processes and mechanism for separating intermixed divided materials according to their specific gravities, such as coal and its impurities, and more especially to such processes and mechanism employing air as the stratifying agent.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 3 is a vertical transverse section taken on line 3—3 of Fig. 1;

Fig. 4 is a longitudinal vertical section on line 4—4 of Fig. 1; and

Fig. 5 is a transverse vertical section on line 5—5 of Fig. 1.

Figure 1:
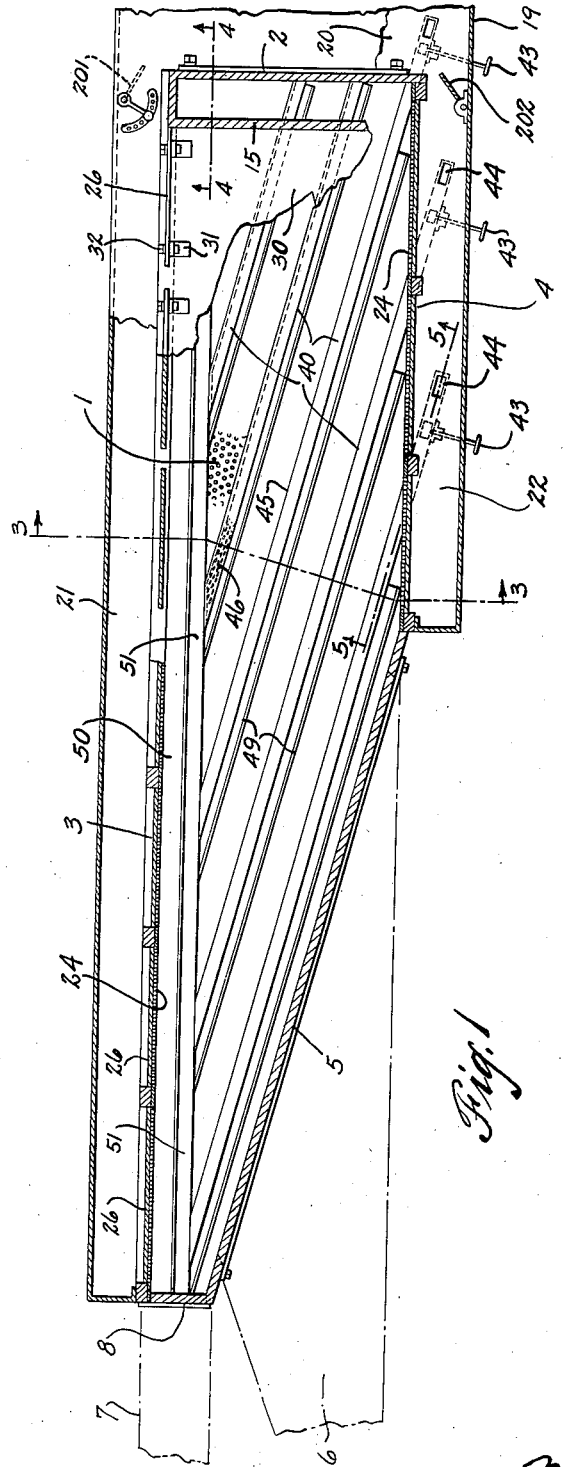
Fig. 1 is a plan view of a separator deck embodying the invention.

A primary object of the invention is to provide a pneumatic-stratification separating process in which purely vertical air currents, and especially the rising of air currents through the top of the bed of materials being separated, are obviated. In known pneumatic-stratification processes the velocity effect of air currents rising through and escaping from the upper surface of the bed of materials causes undesirable effects, particularly with regard to the relatively fine particles which may be intermixed in the mass of material, as in the treatment of coal containing fines. With known processes it is frequently difficult to separate out the finer particles of the heavy impurities because the kinetic energy of the rising air currents tends to blow said fine heavy particles into the top of the bed, where they remain unstratified and intermixed with the flotant stratum of coal. Likewise, the flow of vertical, high-velocity air currents upwardly through and out of the bed tends to cause undesirable size segregation or classification of all the materials so that shortly after the formation of the bed in such processes most of the fine material, both coal and refuse, will be found at one side of the bed, while the coarser materials work toward the other side. This size classification is often undesirable for many reasons. For example, it causes the bed to have different resistances to air current action in different parts so that air will tend to rush through that part of the bed where the fines are absent, providing only a small pressure drop in the bed and thereby aggravating the objectionable conditions. Generally it is desirable to maintain the size distribution throughout the bed as homogeneous as possible, thereby contributing to uniform distribution of air pressure and maintenance of the desirable static pressure drop condition throughout the bed.

The present invention, by preventing vertical escape of air currents through the top of the bed, prevents the above-described displacement and segregation of the fines, thus keeping the bed in a uniform size condition conducive to stratification. The invention provides a method and a means for insuring that the air currents will travel into and through the bed very largely in horizontal or transverse non-vertical paths. Consequently, the air action may be made fairly energetic and a considerable pressure drop and loosening effect be provided by the air currents without attendance of the undesirable blowing of the fine material up and out of the bed. As the fine refuse is prevented from rising to the surface of the bed, it will readily settle and remain settled with the other sizes of refuse in the lower strata. In forms of the process and mechanism utilizing transverse flowage of the settled refuse and flotant coal strata, the invention also prevents the fine refuse material from being blown or carried over the tops of the riffles or separating partitions on the deck. Further, by causing the air currents to travel largely in the horizontal direction within the depth of the bed, there will be very little dead air space in the bed, regardless of the existence of impervious portions in the deck surface. Preferably the cross currents or horizontal drafts of air are fairly closely controlled locally so as to maintain the desired directional effect without undue air force or velocity. It is desirable to avoid a sweeping of air blasts over or through the bed surface, which might tend to displace strata laterally.

Other objects of the invention relate to the provision of novel devices and mechanism for carrying out the process steps. The invention provides a novel form of separating partition or riffle which not only performs the usual refuse-separating and guiding functions but also cooperates in providing the desired motivating and directional effects in the air currents. The invention also provides a novel form of separating deck and table wherein the non-vertical air action may be provided over a relatively large area but nicely regulated and controlled within relatively small areas thereof. A further advantage of the invention is the practical elimination of dust rising from the surface of the bed, thereby eliminating the need for bulky and expensive dust hoods and other dust handling equipment. Another object of the invention is to provide a relatively light and compact separating table construction, practically eliminating the necessity for the usual large air pressure chamber and accompanying sub-construction; also eliminating the need for dust collecting hoods and equipment as mentioned above.

Other objects and advantages of the invention will appear hereinafter or will be obvious from the disclosure. In general the invention is designed to operate on a bed of intermixed divided materials, such as unsized raw coal containing fines. The invention is especially applicable to treatment of relatively fine ranges of unsized coal such as ½″ x 0; ⅛″ x 0; etc., particularly where the amount of very fine material is large. The bed is formed on and caused to travel along a deck which, in a preferred form of the process, is air-pervious and is preferably given a reciprocating or material-agitating and impelling movement. The invention may also be applied to separators and processes wherein movement of the bed is effected by gravity alone or where the vibrational effect is caused by pulsation of the air currents. In general, air currents are forced or drawn upwardly through the pervious deck or a portion thereof, and are substantially immediately directed approximately horizontally through the bed of materials and out of the bed at loci within the depth of the bed, so that no air currents blow upwardly through or from or over the top of the bed. In practice the bed may be formed as a relatively long and narrow unit for the easy regulation of force and direction of the air currents or, as in the form here shown in detail, a somewhat wider bed may be divided into numerous parallel units so far as the direction and control of the air is concerned whereby the desired non-vertical air action can be suitably controlled. Due to the loosening and levitating effect of the air pressure and air currents within and through the bed, cooperating with the vibrating motion of the bed and the natural separating effect of gravity, the materials of different densities will stratify in accordance with their specific gravities and irrespective of their differences in size.

It will be understood that the foregoing general description and the following detailed description as well are exemplary and explanatory of the invention but are not restrictive thereof.

Referring now in detail to the present preferred embodiment of the invention, in the accompanying drawings same is illustrated as applied to a table of the general Peale-Davis construction as illustrated in numerous patents assigned to said Peale-Davis Company, but it will be understood that the invention is broadly applicable to pneumatic separation processes and machines in general. As shown, the table or separator mechanism comprises generally an air-pervous deck 1 which is relatively long and narrow, being provided with a rectangular rear or feed end 2, a relatively long refuse concentrating side 3, a relatively short opposite side 4, and a coal spillage edge 5 inclined forwardly from the end of the short side 4 toward the end of the long side. The sides 2, 3 and 4 are provided with suitable retaining walls for the maintenance of the bed of material, while the spillage edge 5 is flush with the deck surface 1 and may be provided with any suitable adjustable spillage partition in accordance with customary practice. A spillage plate 6 is diagrammatically shown leading from the spillage edge 5 to a suitable coal conveyor or the like, while a refuse conveyor 7 leads from the refuse spillage end 8 formed at the end of the side 3 and extending normal thereto for a short distance to intersect the spillage edge 5.

Figure 2:
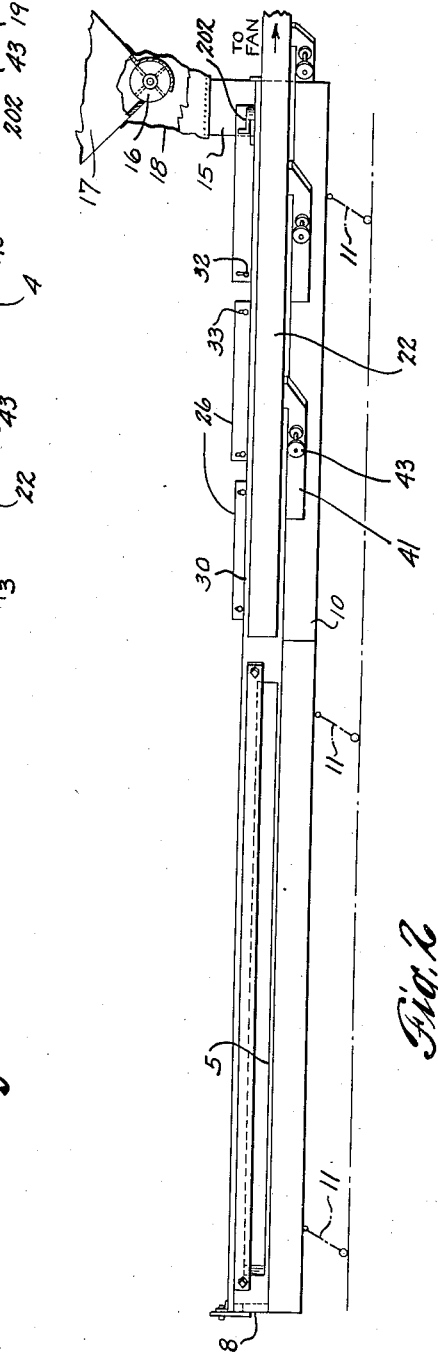
Fig. 2 is a side elevation of the deck shown in Fig. 1.

The deck 1 and its associated parts is preferably mounted for longitudinal reciprocation so as to give an upward and forward throw to the material thereon and a more rapid falling and returning movement, in accordance with customary separator practice. The deck 1 is conveniently mounted on longitudinal frame members 10 which extend downwardly therefrom along the longitudinal side edges, said frame members cooperating with suitable cross framing to provide sufficient structural strength and stiffening to the deck. The deck frame is in turn reciprocably mounted upon rearwardly and upwardly inclined links 11 which are shown diagrammatically in Fig. 2. While shown as generally level, the deck may be sloped lengthwise and/or transversely in any manner found desirable in practice, the means for so positioning the deck being omitted for clearness. It will be understood that the general features of the table construction and mounting are no essential part of the invention and are shown largely in diagrammatic form and are understood to conform with usual trade practices. The table and its associated parts are adapted to be reciprocated rapidly on the links 11 by means of a suitable motorized eccentric drive of the usual type, not shown.

Means for feeding the intermixed raw coal or other materials to the rear or feed end 2 of the deck comprise the relatively narrow feed chute 15 which extends across the rear end of the table and communicates with the conventional feed regulating mechanism 16 of a stationary feed hopper 17 through a flexible chute 18 which permits reciprocation thereof with respect to the stationary hopper. In general, the bed of materials formed at the feed end of the deck will travel forwardly, undergoing progressive stratification. The flotant stratum of coal or lighter material flows forward and discharges over the spillage edge 5, while the settled and lower stratum of heavy refuse is guided toward the side 3 and along same to discharge at the end 8.

In accordance with the invention means are provided for causing air currents to be drawn upwardly through the pervious deck 1 and thence horizontally through and out of the bed of materials without rising to the top of the bed. In the preferred form of the invention, the air currents are created by applying suction at suitable loci to draw the air into, through and out of the bed in the desired directions. For creating the suction action, a suitable fan (not shown) is mounted to the rear of the table and the intake side thereof is connected by suitable flexible connecting conduits to the desired loci on and about the separator deck. As shown, a main suction conduit or manifold 19 connecting with the intake of the fan is formed about the rear end and longitudinal side edges of the deck to provide the rear manifold 20, a longitudinal conduit 21 extending along the side 3 of the deck and a similar conduit 22 extending along the side 4. Externally settable valves 201 and 202 are positioned to regulate the relative distribution of air drafts in the respective conduits 21 and 22. Said conduits and manifold are air-tight and communicate directly with the space above the surface of the deck 1 normally occupied by the bed of coal thereon through air-pervious vertical plates 24 which form the side retaining walls of the separator table. Similarly the retaining wall 25 across the rear end 2 of the deck is perforated to permit communication with the rear end conduit 20.

In accordance with the invention the passage of air through the retaining walls and into the conduits should take place below the top of the bed of materials, which is diagrammatically indicated in Fig. 3 by the broken line B, and vertical adjustment of the extent of the air openings will be required to control the action with beds of different thicknesses as will be found to occur with the treatment of different sizes and consistencies. Vertically adjustable air controlling valve plates 26 are provided to extend along the plates 24 and 25 respectively, thereby to regulate the vertical extent of air passage through the side and end walls of the table into the suction conduits. The air controlling plates 26 pass through suitable slots in the plate 30 and are adjustably mounted for vertical sliding movement with respect thereto by the angle brackets 31 and the bolts 32 which extend through suitable adjustment slots 33 in said plates. As will be clear from the drawings, the suction existing in the side conduits 21 and 22 will draw air upwardly through the openings in the perforate deck 1 and into the bed of materials B and thence transversely and substantially horizontally through the bed and out of same through the perforations in the side walls 24. By maintaining the lower edges of the imperforate air controlling plates 26 slightly below the upper surface of the bed B, any escape of air through the top of the bed will be prevented.

Means are provided for causing the air current supply for the side and end conduits to come through from beneath the pervious deck 1. To insure this effect, the entire upper surface of the deck is sealed and impervious to air by means of the top sealing plate 30 which is fixed to the top flanges of the side wall plates 24. In accordance with the invention, on a fairly narrow bed such as is used on certain long and narrow trough-like tables, the air action created by the side suction conduits alone will be sufficient to give the separating and controlling effects desired in carrying out the invention. However, to apply the invention to tables of different types and especially those having transverse flowage of the materials, we provide means at several intermediate spaced-apart loci within the bed for providing additional sources of air suction. By this means the continuity of air action and the accurate localized control of the air currents, both in force and in direction, may be carefully and simply regulated. As embodied, the bed of materials is sub-divided by a plurality of air-suction members extending into and along the bed whereby the creation of the air currents which are drawn upwardly through the pervious deck may be shared by these numerous suction creating means. In accordance with another feature of the invention, the structural means for creating said localized suction are also utilized to act as separating partitions or riffles similar in function and general arrangement to those now employed on Peale-Davis type separating tables.

Referring to the drawings (Figs. 1, 3 and 5) the invention provides a plurality of spaced-apart suction conduits 40 which underlie the surface of the pervious deck 1 and extend transversely thereof substantially parallel to the spillage edge 5. Said conduits 40 are preferably formed of metal and have solid walls impervious to air. The rear end of each conduit communicates by an individual passage 41 with the main side suction passage 22 (Figs. 1 and 5), said passage 41 extending through the side beams 10 and thence opening upwardly at 44 into the bottom of the conduit 22. An externally controllable valve 42 with a projecting handle 43 is provided for individually regulating the amount of air drawn by conduits 41 and 40. Depending upon the extent of the table and the spacing and direction of the conduits 40, a certain number thereof will extend under the rear end 2 of the deck and will thus communicate with the suction chamber 20 at the rear of the table, the construction of said communications being the same as those into the side conduit 22.

The conduits 40 are caused to extend upwardly into the bed of materials for a substantial distance, depending upon the desired extent of the air action vertically and also to some extent upon the size and character of materials to be treated. As shown, the rear or feed side 45 of said extended portions is continued as a vertical member up to a relatively short distance below the top of the bed B and said side 45 is perforated so as to be highly pervious to air but with a size of perforation so small as to prevent entry of any of the material except the finest dust. The opposite or forward side 46 of said extended portion is preferably inclined downwardly and forwardly from the top of the member 45 to the surface of the deck and said inclined member 46 is similarly air pervious throughout its extent. Thus the perforate walls 45 and 46 together form an air suction strip or riffle which is adapted to function as a material guiding and separating partition and also as an air suction creating means. In accordance with established practice the forward ends of the air suction strips preferably lie short of the side wall 24 of the deck so that settled refuse guided toward said wall may be concentrated and travel forwardly in an unobstructed concentrated path to discharge at the forward refuse discharge edge 8. Any suitable refuse-discharge controlling means may be furnished at that point.

For treatment of some materials, especially those containing a large number of fines, supplementary means for catching and guiding the finer particles of settled refuse may be provided if desired. As shown, the air conduits 40 are attached to and supported with respect to the pervious deck by longitudinal supporting members 47 along either side of the conduit and against the bottom surface of the deck 1. Said impervious members 47 block the direct passage of air into the portion of the deck immediately above them so that they form in effect narrow sheltered areas into which the finest heavy material can settle and remain. It will be clear that there is no substantial "dead" space in the bed for any material distance above said members 47, due to the horizontal deflection of the air currents passing through the walls 45 and 46. To further assist in trapping and guiding fine material which settles over the member 47 on the forward side of the air suction strip, i. e., adjacent the inclined wall 46, we may provide an additional, relatively short vertical fines-guiding strip 49 which is preferably formed by an angle piece seated just above the top edge of the supporting member 47. A substantial amount of the very fine refuse will thus be guided along sheltered impervious areas 48 and 49 into the refuse channel 50 at the ends of the strips and thence forwardly along the table to discharge. If desired, an auxiliary non-pervious fines-concentrating channel 51 may be provided along the termini of the air strips 45, 46, so as to prevent the finer refuse from being delivered into the air pervious main refuse channel 50, where the air currents might cause some remixture.

The operation of the foregoing mechanism will be understood in general from the foregoing description. It will be clear that any purely vertical air currents are substantially entirely eliminated by the invention and that no air currents escape upwardly through the top of the bed. The directions of the air currents are diagrammatically indicated in the right hand portion of Fig. 3 and it will be clear that similar air action takes place between any other two adjacent air conduits 40, 46. Due to the angle at which the air currents pass through the bed into the air suction conduits, there are substantially no "dead" air spaces in the bed, even though certain impervious portions may exist on the deck as over the strips 47. There are no air currents passing over the top of the air-pervious separating strips, so that fine material is not blown above or across the tops of the strips, thus preventing the remixture of fine heavy material with the lighter material as frequently happens in present processes. At the same time the finest refuse which settles into sheltered areas is protected from disturbance and, by means of the strips 49, will be controlled by sliding back into the main body of the bed even when the bed is laterally inclined. In the portion of the deck lying between the forward edge of the last air strip 46 and the coal spillage edge 5, the air will be drawn into the strip in a direction opposite to the travel of the coal spilling over said edge 5, thus preventing fine heavy material from being carried away with the discharging coal.

By eliminating vertical escape of air currents, the invention makes it possible to apply relatively high velocity air action so that a relatively wide size range of materials can be treated with assurance that there will be sufficient air to stratify the larger sizes without blowing the fines out of the bed. For a similar reason the invention also makes it possible to obtain good stratification even in areas where the bed is relatively thin. It will be clear that any desired variation of the air current strength may be effected locally of the bed by individually regulating the amount of air with respect to the various conduits 40 and also as between the conduits 40 and the main exterior conduits 20, 21 and 22. Also the amount of air admitted to various parts of the deck may be further controlled if desired by varying the perviosity in different deck zones or by other known or suitable means. The heights of the members 46 may also vary at different parts of the table.

In accordance with the invention it is desirable that the greatest force and intensity of air action occur near the bottom of the bed and decrease toward the surface of the bed. This gradation of air action vertically of the bed gives the effect of a pressure drop on the materials, causing the denser materials to settle relatively more rapidly than the more buoyant lighter materials. This desired effect is caused by the arrangement shown, as the air currents entering through the deck 1 tend to follow the shortest path to the source of low pressure. Hence the force and amount of air will be greatest near the bottom of the bed and diminish upwardly through the bed until there is practically no air action at the top.

All dust in the bed sufficiently fine to pass through the perforations in the members 24, 45 and 46 will be drawn immediately through the fan into suitable dust collecting equipment so that no dust will exist about the table or plant.

As one proposed alternative method of operating in accordance with the general principles of the invention, the entire air action may be provided by means of air strips 45, 46. That is, the deck 1 may be made impervious throughout, while every other conduit 40 will be made open to the atmosphere and blocked from communication with the suction conduit 22. Thus air will be drawn from an open conduit 40 out of the walls 45 and 46, through the bed of materials and into the walls 45 and 46 of the next adjacent suction conduit (or through side walls 24, as the case may be). Such arrangement will thus provide a substantially completely horizontal passage of air currents through the bed, while in other respects the operation of the invention will be substantially as described hereinabove.

By another and quite different system of operation, the general air action effects provided by the invention may also be realized. That is, by utilizing the construction exactly as shown, but by reversing the fan so as to blow air into the conduits 20, 21, 22 and 40, air will be caused to issue into the bed from the walls 24, 45 and 46, through the bed and out through the perforate deck 1. The tendency of the air currents in this operation will be to travel transversely and somewhat downwardly, which may be desirable with the treatment of some materials.

While the air-suction conduits 40 and members 45, 46 have been illustrated with a table having transverse flowage of the strata, these members may also be applied to tables and processes in which the travel of the strata is unidirectional or parallel. Thus in a trough-type table such as shown in Stump Patent 2,086,584 several suction conduits may be placed parallel to the side walls along the bed so as to provide the desired horizontal air action. These conduits would act to prevent lateral shifting of the bed but would cause no transverse travel of the heavy material. In such construction the conduits may be above the pervious deck rather than below it, the pervious suction portions extending downwardly into the bed from above. Suitable variations in perviosity of said portions may be provided to effect the desired gradation of the air action vertically or otherwise.

The invention in its broader aspects is not limited to the specific mechanisms shown and described but departures may be made therefrom within the scope of the accompanying claims without departing from the principles of the invention and without sacrificing its chief advantages.

What we claim is:

1. The process of purifying coal or other intermixed materials of varying specific gravities which comprises maintaining a travelling bed of the material of substantial depth undergoing progressive stratification in accordance with the specific gravities of the materials through the action of gravity, including the steps of introducing air upwardly through the bottom of the bed and passing same through the bed and causing said air to escape from the bed by passing transversely through the bed and out near the bottom thereof and separately delivering the strata of light and of heavier materials from the bed.

2. A pneumatic separator including in combination an air pervious material-supporting deck, a plurality of spaced material-guiding partitions thereon, the upstanding faces of said partitions being air-pervious and means for drawing air through said deck into the bed of materials supported thereon and thence out of the bed through that portion of the faces of said partitions which are below the surface of the bed.

3. The process of purifying coal or other intermixed materials of varying specific gravities which comprises maintaining a travelling bed of the material of substantial depth undergoing progressive stratification in accordance with the specific gravities of the materials through the action of gravity and of the passage of air under pressure through the bed, including the steps of confining the materials in the bed and causing them to travel in a predetermined direction, introducing air under pressure into the bed below the top thereof, passing said air through the bed below the top and causing it to escape from the bed below the top while preventing escape of material from the bed therewith, whereby the travel of air through the bed is at a substantial angle to the vertical and unrelated to the flow of the materials in the bed.

4. The process of purifying coal or other intermixed materials of varying specific gravities which comprises maintaining a travelling bed of the material of substantial depth undergoing progressive stratification in accordance with the specific gravities of the materials through the action of gravity and of the passage of air under pressure through the bed, including the steps of confining the materials in the bed and causing them to travel in a predetermined direction, introducing air under pressure into the bed below the top thereof, confining the space above the top of the bed to prevent passage of air upwardly therefrom, passing said air through the bed below the top and causing it to escape from the bed in substantial quantities near the bottom of the bed, the travel of said air through the bed being at a substantial angle to the vertical and toward loci separate from the discharge of the materials in the bed.

5. The process of purifying coal or other intermixed materials of varying specific gravities which comprises maintaining a travelling bed of the material of substantial depth undergoing progressive stratification in accordance with the specific gravities of the materials through the action of gravity and of the passage of air under pressure through the bed, including the steps of confining the materials in the bed and causing them to travel in a predetermined direction, introducing air under pressure into the bed below the top thereof, confining the space above the top of the bed to prevent passage of air upwardly therefrom, passing said air through the bed below the top and causing it to escape from the bed below the top while preventing escape of material from the bed therewith, whereby the travel of air through the bed is at a substantial angle to the vertical and unrelated to the flow of the materials in the bed.

6. The process of purifying coal or other intermixed materials of varying specific gravities which comprises maintaining a travelling bed of the material of substantial depth undergoing progressive stratification in accordance with the specific gravities of the materials through the action of gravity and of the passage of air under pressure through the bed, including the steps of passing air upwardly into the bed and laterally through the bed to escape through the sides of the bed and below the top thereof and confining the materials of the bed to travel along said sides to discharge at places remote from the escape of the air.

7. The process of purifying coal or other intermixed materials of varying specific gravities which comprises maintaining a travelling bed of the material of substantial depth undergoing progressive stratification in accordance with the specific gravities of the materials through the action of gravity and of the passage of air under pressure through the bed, including the steps of maintaining a high air pressure at the bottom of the bed, confining the space above the top of the bed to prevent upward escape of air and maintaining relatively low pressure zones along the sides of the bed to permit escape of air by travelling transversely through the bed to escape at the sides, and preventing materials of the bed from escaping with the air at said sides.

8. The process of purifying coal or other intermixed materials of varying specific gravities which comprises maintaining a travelling bed of the material of substantial depth undergoing progressive stratification in accordance with the specific gravities of the materials through the action of gravity and of the passage of air under pressure through the bed, including the steps of maintaining a high air pressure at the bottom of the bed, confining the space above the top of the bed to prevent upward escape of air and maintaining relatively low pressure zones along the sides of the bed and extending upwardly from near the bottom of the bed throughout a substantial portion of the stratification of the materials therein to permit escape of air by travelling transversely through the bed to escape at the sides.

9. The process of purifying coal or other intermixed materials of varying specific gravities which comprises maintaining a travelling bed of the material of substantial depth undergoing progressive stratification in accordance with the specific gravities of the materials through the action of gravity and of the passage of air under pressure through the bed, including the steps of introducing air under pressure into the bed below the top thereof and causing said air to escape from the bed at loci extending from substantially the bottom of the bed to below the top of the bed for substantially the length of travel of the materials in the bed.

10. A pneumatic separator including in combination a material-supporting deck, an air-pervious, material-restraining wall extending along a substantial part of the stratification area of the deck, means for maintaining a bed of materials travelling over the deck and along said wall, means for introducing air into the bed of materials below the top thereof and means for causing said air to escape from the bed through that portion of said pervious wall which is below the surface of the bed, the openings in said pervious wall being of a size small enough to prevent escape of material with the air.

RICHARD PEALE.
REMBRANDT PEALE, JR.